United States Patent
Busjaeger et al.

(10) Patent No.: US 11,695,559 B2
(45) Date of Patent: Jul. 4, 2023

(54) NESTED TENANCY THAT PERMITS A HIERARCHY HAVING A PLURALITY OF LEVELS

(71) Applicant: salesforce.com, inc., San Francisco, CA (US)

(72) Inventors: Benjamin Busjaeger, San Carlos, CA (US); Koson Thambundit, San Ramon, CA (US); Jeremy Horwitz, San Francisco, CA (US); Michael Sgroi, San Francisco, CA (US); Jeffrey M. Bergan, San Francisco, CA (US); Benjamin James Fry, Berkeley, CA (US); Brian Robert McNamara, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 645 days.

(21) Appl. No.: 16/588,550

(22) Filed: Sep. 30, 2019

(65) Prior Publication Data
US 2021/0099301 A1    Apr. 1, 2021

(51) Int. Cl.
| | | |
|---|---|---|
| H04L 9/32 | (2006.01) | |
| H04L 9/40 | (2022.01) | |
| G06F 16/9035 | (2019.01) | |
| G06F 16/907 | (2019.01) | |
| G06F 16/955 | (2019.01) | |
| G06F 9/50 | (2006.01) | |

(52) U.S. Cl.
CPC .......... *H04L 9/3213* (2013.01); *G06F 16/907* (2019.01); *G06F 16/9035* (2019.01); *G06F 16/955* (2019.01); *H04L 63/10* (2013.01); *H04L 63/1408* (2013.01); *G06F 9/5072* (2013.01)

(58) Field of Classification Search
None
See application file for complete search history.

(56) References Cited

U.S. PATENT DOCUMENTS

| | | | | |
|---|---|---|---|---|
| 6,212,524 B1* | 4/2001 | Weissman | ............. | G06F 16/283 707/769 |
| 8,352,941 B1* | 1/2013 | Protopopov | .......... | H04L 63/102 718/1 |

(Continued)

FOREIGN PATENT DOCUMENTS

JP    2016500854 A    1/2016

OTHER PUBLICATIONS

Camarinha-Matos et al "Cloud-Based Collaboration Spaces for Enterprise Networks," IEEE, pp. 185-190 (Year: 2015).*

(Continued)

*Primary Examiner* — Luu T Pham
*Assistant Examiner* — James J Wilcox
(74) *Attorney, Agent, or Firm* — Kowert, Hood, Munyon, Rankin & Goetzel, P.C.; Dean M. Munyon

(57) ABSTRACT

A multi-tenant computer system implements a platform for providing data protection scopes to shared infrastructure services according to a nested tenant model that permits a hierarchy having a plurality of levels. The multi-tenant computer system provisions data protection scopes for cloud products, service products, cloud product tenants, service products operating in the context of cloud products, service products operating in the context of cloud product tenants, and combinations of the foregoing.

20 Claims, 9 Drawing Sheets

(56) References Cited

U.S. PATENT DOCUMENTS

| | | | |
|---|---|---|---|
| 8,392,969 B1* | 3/2013 | Park | G06Q 10/00 726/8 |
| 9,003,477 B2* | 4/2015 | Gillum | G06F 21/00 726/1 |
| 9,330,102 B2* | 5/2016 | McGrath | G06F 16/13 |
| 9,348,652 B2 | 5/2016 | Raghu | |
| 9,398,016 B1* | 7/2016 | Chakraborty | H04L 63/20 |
| 9,432,379 B1* | 8/2016 | Roche | H04L 63/0807 |
| 9,473,419 B2 | 10/2016 | Brand | |
| 9,781,122 B1* | 10/2017 | Wilson | H04L 63/08 |
| 9,798,570 B2 | 10/2017 | Gallant et al. | |
| 9,813,303 B1* | 11/2017 | Guigli | H04L 61/5014 |
| 9,894,147 B1* | 2/2018 | Zalpuri | G06F 8/65 |
| 10,057,273 B1* | 8/2018 | Chakraborty | H04L 67/1044 |
| 10,218,703 B2* | 2/2019 | Beiter | H04L 63/102 |
| 10,230,708 B2* | 3/2019 | Eberlein | G06F 16/211 |
| 10,404,702 B1* | 9/2019 | Chakraborty | H04L 63/101 |
| 10,454,940 B2* | 10/2019 | Lander | H04L 63/0815 |
| 10,554,507 B1* | 2/2020 | Siddiqui | H04L 63/1433 |
| 10,565,392 B2* | 2/2020 | Resch | G06F 21/62 |
| 10,616,224 B2* | 4/2020 | Subramanian | H04L 67/146 |
| 10,951,600 B2* | 3/2021 | Kona | H04W 12/009 |
| 11,153,273 B2* | 10/2021 | Carbone | H04L 61/305 |
| 11,196,627 B1* | 12/2021 | Khoo | H04L 41/0816 |
| 11,258,795 B2* | 2/2022 | McAninch | H04L 63/10 |
| 11,398,900 B2* | 7/2022 | Vepa | H04L 9/083 |
| 11,516,254 B2* | 11/2022 | Singh | H04L 63/20 |
| 11,570,181 B2* | 1/2023 | Dasari | H04L 63/104 |
| 2010/0125612 A1 | 5/2010 | Amradkar | H04L 63/105 707/E17.014 |
| 2011/0231541 A1* | 9/2011 | Murthy | H04L 63/10 709/224 |
| 2012/0017089 A1* | 1/2012 | Kocher | G07F 7/1008 713/172 |
| 2012/0131101 A1* | 5/2012 | Said | G06F 9/5072 709/204 |
| 2012/0131660 A1* | 5/2012 | Dalzell | H04L 63/062 726/9 |
| 2012/0185946 A1* | 7/2012 | Kamara | H04L 9/085 726/26 |
| 2012/0204219 A1* | 8/2012 | Kopti | G06F 21/56 726/1 |
| 2013/0138806 A1* | 5/2013 | Gohad | G06F 9/5072 709/224 |
| 2013/0191842 A1* | 7/2013 | Sripathi Panditharadhya | G06F 9/5083 718/105 |
| 2014/0007178 A1* | 1/2014 | Gillum | G06F 21/00 726/1 |
| 2014/0173694 A1* | 6/2014 | Kranz | H04L 63/10 726/4 |
| 2014/0266613 A1* | 9/2014 | Sehmer | G06K 19/07758 340/10.1 |
| 2014/0330869 A1 | 11/2014 | Factor et al. | |
| 2015/0006609 A1* | 1/2015 | Sampath | G06F 9/5072 709/202 |
| 2016/0034277 A1* | 2/2016 | Syed | G06F 9/541 717/136 |
| 2016/0042194 A1* | 2/2016 | Chakraborty | G06F 3/0622 726/17 |
| 2017/0272472 A1* | 9/2017 | Adhar | G06F 21/602 |
| 2017/0331802 A1* | 11/2017 | Keshava | H04L 9/0894 |
| 2018/0097802 A1* | 4/2018 | Lander | H04L 63/083 |
| 2018/0225472 A1* | 8/2018 | Wong | G06F 21/6218 |
| 2018/0260251 A1 | 9/2018 | Beveridge et al. | |
| 2019/0075155 A1* | 3/2019 | Wei | H04L 67/10 |
| 2019/0166125 A1* | 5/2019 | Bender | H04L 63/02 |
| 2019/0182226 A1* | 6/2019 | Bakthavachalam | H04L 63/0807 |
| 2019/0324744 A1* | 10/2019 | Alam | G06N 3/047 |
| 2019/0361895 A1* | 11/2019 | Weaver | G06F 16/285 |
| 2020/0097310 A1* | 3/2020 | Shukla | G06F 9/45558 |
| 2020/0252404 A1* | 8/2020 | Padmanabhan | G06F 16/2308 |
| 2021/0044540 A1* | 2/2021 | Rushton | H04L 41/0894 |
| 2021/0044542 A1* | 2/2021 | Goyal | H04L 47/782 |
| 2021/0064627 A1* | 3/2021 | Kleiner | G06F 16/248 |
| 2021/0067423 A1* | 3/2021 | Newman | H04L 43/55 |
| 2021/0099301 A1* | 4/2021 | Busjaeger | G06F 9/5072 |
| 2021/0234849 A1* | 7/2021 | Lamb | G06Q 20/382 |
| 2021/0279247 A1* | 9/2021 | Kumar | G06F 16/256 |
| 2021/0318913 A1* | 10/2021 | Moyer | H04L 69/08 |
| 2021/0377276 A1* | 12/2021 | Dasari | G06F 21/6218 |
| 2022/0086165 A1* | 3/2022 | Dasari | H04L 63/101 |
| 2022/0159010 A1* | 5/2022 | Bandarupalli | H04L 63/105 |
| 2022/0197707 A1* | 6/2022 | Ghodake | G06F 9/5072 |
| 2022/0239661 A1* | 7/2022 | Carver | G06F 9/5072 |
| 2022/0337599 A1* | 10/2022 | Merricks | H04L 63/10 |
| 2022/0350675 A1* | 11/2022 | Navali | G06F 9/45558 |
| 2022/0391523 A1* | 12/2022 | Kwong | G06F 21/6218 |
| 2022/0414601 A1* | 12/2022 | Shek | G06Q 10/103 |
| 2023/0032267 A1* | 2/2023 | Mordani | G06F 9/5072 |

OTHER PUBLICATIONS

Bien et al "Hierarchical Multi-Tenant Pattern," IEEE, pp. 157-164 (Year: 2014).*

International Search Report and Written Opinion in PCT Appl. Np. PCT/US2020/053006 dated Jan. 11, 2021, 15 pages.

Li et al., "A Refined RBAC Model for Cloud Computing," 2012 IEEE/ACIS 11th International Conference on Computer and Information Science, May 30, 2012, pp. 43-48.

* cited by examiner

800

```
┌─────────────────────────────────────────────────────────────┐
│ Provision, by the computer system for a shared infrastructure service, a │
│ first data protection scope for a cloud product having a first set of tenants, │─ 802
│ wherein the first data protection scope is provisioned at a top level of a │
│                    scope hierarchy.                         │
└─────────────────────────────────────────────────────────────┘
                              │
                              ▼
┌─────────────────────────────────────────────────────────────┐
│ Provision, by the computer system for the shared infrastructure service, a │
│    second data protection scope for a particular one of the first set of    │
│    tenants, wherein the second data protection scope is provisioned at a    │─ 804
│    next level of the scope hierarchy; wherein the second data protection    │
│ scope is provisioned subordinately to the first data protection scope in the │
│                        scope hierarchy                      │
└─────────────────────────────────────────────────────────────┘
```

```
┌─────────────────────────────────────────────────────────────┐
│ Provision, by the computer system for a shared infrastructure service, a │
│   first data protection scope for a service product that manages data for   │
│  cloud products and tenants of the cloud products, wherein the first data   │─ 812
│      protection scope is provisioned at a top level of a scope hierarchy.   │
└─────────────────────────────────────────────────────────────┘
                              │
                              ▼
┌─────────────────────────────────────────────────────────────┐
│ Provision, by the computer system for the shared infrastructure service, a │
│    second data protection scope for the service product in the context of a │
│    particular cloud product, wherein the second data protection scope is    │─ 814
│          provisioned at a second level of the scope hierarchy.              │
└─────────────────────────────────────────────────────────────┘
                              │
                              ▼
┌─────────────────────────────────────────────────────────────┐
│ Provision, by the computer system for the shared infrastructure service, a │
│     third data protection scope for the service product in the context of a │
│    particular tenant of the particular cloud product, wherein the third data│
│   protection scope is provisioned at a third level of the scope hierarchy   │─ 816
│           subordinate to the top level and the second level                 │
└─────────────────────────────────────────────────────────────┘
```

FIG. 8B

NESTED TENANCY THAT PERMITS A HIERARCHY HAVING A PLURALITY OF LEVELS

BACKGROUND

Technical Field

This disclosure relates generally to multi-tenant computer systems.

Description of the Related Art

Software-level multi-tenancy enables a single instance of software to run on computer hardware and provide services to a plurality of users. These users are referred to as tenants. With multi-tenancy, a software application is designed to provide these tenants with a share of the instance such that data, metadata, configurations, settings, user management and other functions are isolated from the other tenants.

BRIEF DESCRIPTION OF THE DRAWINGS

FIGS. 7, 8A, and 8B are flow diagrams illustrating embodiments of methods associated with templates

Figure 1:
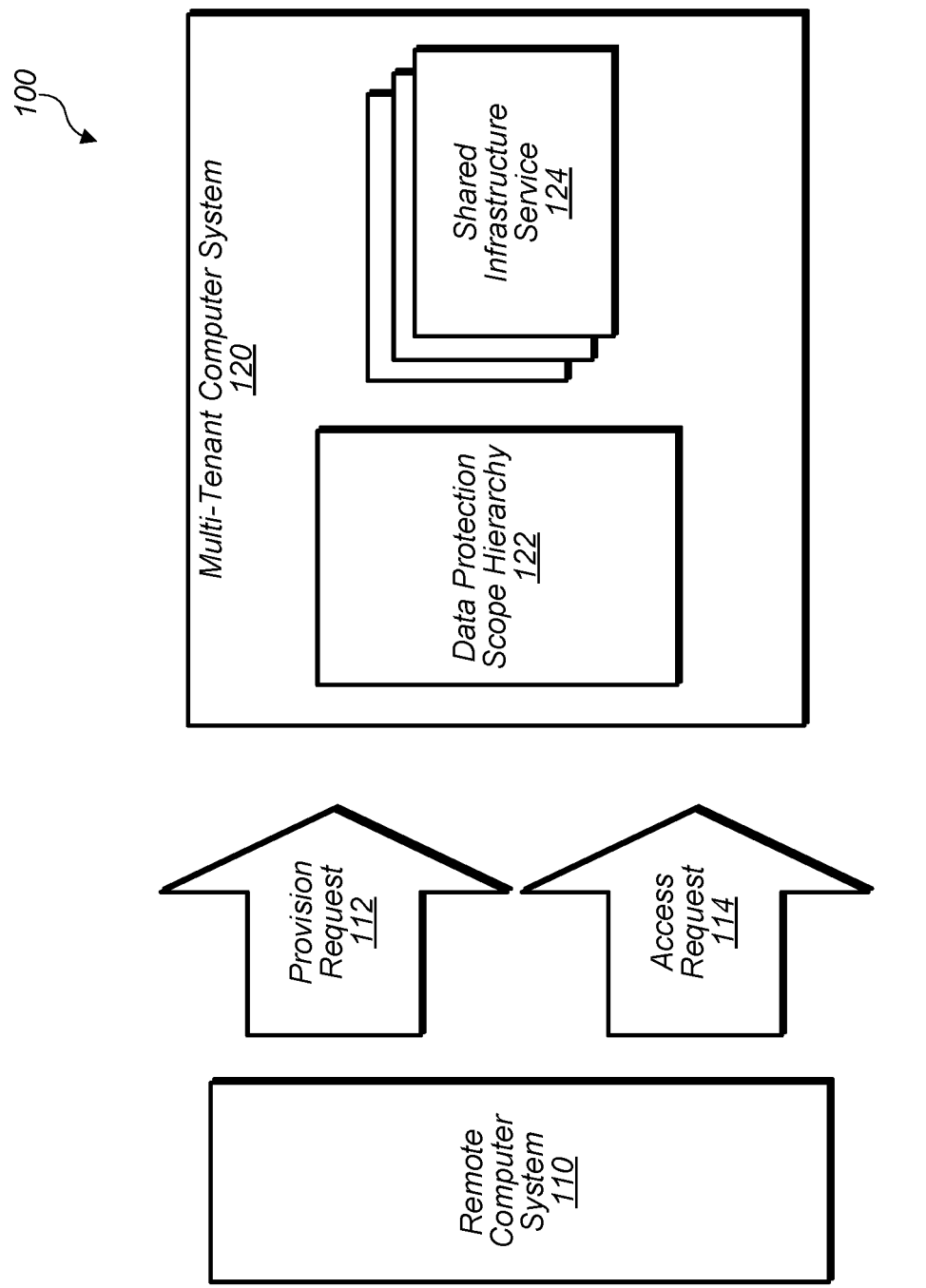
FIG. 1 is a block diagram illustrating an embodiment of a computer system configured to implement a nested multi-tenancy in accordance with various embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to receive a request" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" data protection scopes would not imply an ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, the word "module" refers to structure that stores or executes a set of operations. A module refers to hardware that implements the set of operations, or a memory storing the set of instructions such that, when executed by one or more processors of a computer system, cause the computer system to perform the set of operations. A module may thus include an application-specific integrated circuit implementing the instructions, a memory storing the instructions and one or more processors executing said instructions, or a combination of both.

DETAILED DESCRIPTION

Referring now to FIG. 1, a block diagram of an exemplary embodiment of a computer system 100 is depicted. In various embodiments, computer system 100 includes a remote computer system 110 in communication with a multi-tenant computer system 120. In various embodiments, remote computer system 110 is associated with a tenant (or a tenant of a tenant) of multi-tenant computer system 120 and is requesting access (e.g., with a provision request 112 and/or an access request 114) to one or more shared infrastructure services 124.

In various embodiments. remote computer system 110 is any of a number of computer systems (e.g., server, laptop computer, desktop computer, tablet computer, mobile device, wearable computer) configured to interface with multi-tenant computer system 120. In various embodiments, remote computer system 110 is implemented using a single computer system or a cloud of computer systems. In various instances, remote computer system 110 sends (e.g., over a wired and/or wireless network that, in various embodiments, includes the Internet) provision request 112 and access request 114 to multi-tenant computer system 120. As discussed herein, these requests 112 and 114 enable remote computer system 110 to access shared infrastructure services 124 in a controlled and secure manner that ensures data protection and privacy.

In various embodiments, multi-tenant computer system 120 is any of a number of computer systems (e.g., server, laptop computer, desktop computer, tablet computer, mobile device, wearable computer) configured to implement a multi-tenant platform including one or more shared infrastructure services 124. As discussed herein, this multi-tenant platform is also configured to provide data protection scopes to these shared infrastructure services 124. As used herein, "platform" refers to software that performs the functions described herein when executed on hardware (e.g., multi-tenant computer system 120). In various embodiments, multi-tenant computer system 120 is implemented using a single computer system or a group of computer systems (e.g., a distributed cloud environment).

In various embodiments, access to shared infrastructure services 124 is controlled using a data protection scope hierarchy 122. In various embodiments, data protection scope hierarchy 122 includes a plurality of levels of data protection scopes. As discussed herein in further detail in reference to FIGS. 2-8, hierarchy 122 includes a plurality of different data protection scopes protecting different types of information (e.g., cloud product data protection scope 202, service product data protection scope 204 discussed herein). In such embodiments, multi-tenant computer system 120 implements a platform for providing data production scopes to one or more shared infrastructure services 124 according to a nested tenancy model implemented with data protection scope hierarchy 122. As used herein the term "nested tenancy" and "nested multi-tenancy" refer to multi-tenancy models in which tenants themselves have (or can have) tenants (also referred to herein as subtenants). Tenants at the top-level of these models are also referred to herein as "first-class tenants." In various instances, these various data protection scopes are associated with cloud products or service products implemented as top-level tenants of the multi-tenant computer system 120. In various instances, the various cloud products each have their own sets of tenants and data protection scope hierarchy 122 includes cloud product tenant data protection scopes that are subordinate to their respective cloud product. Similarly, service products may execute in the context of cloud products or tenants of cloud products with respective data protection scopes. Data protection scope hierarchy 122 and the various data protection scopes are further discussed herein in reference to FIG. 2.

In various embodiments, shared infrastructure services 124 are any of a number of shared services that provide for nested tenancy (e.g., tenants that have subtenants). As used herein a "shared infrastructure service" is a single instance of software that can be accessed by multiple tenants according to a multi-tenancy model and provides supporting functions to the functionality of its tenants. In various embodiments, for example, a first shared infrastructure service 124 provides shared database templates for use by any of a number of kinds of databases that are top-level tenants, many of which in turn have their own tenants (also referred to herein as "subtenants"). In such embodiments, this shared template service is operable to provide one or more selectable database templates that define data types supported for a non-relational database accessible to an application, service a request from the application to manipulate a particular data type defined by a selected database template, identify a set of data manipulation language (DML) instructions based on the selected database template, and issue the identified set of DML instructions to the nonrelational database. Shared template services are disclosed in further detail in U.S. patent application Ser. No. 16/121,598 which is incorporated herein in its entirety. In another embodiment, shared infrastructure service 124 provides scheduling services for different services that have their own tenants.

In various embodiments, multi-tenant computer system 120 provisions data protection scopes in hierarchy 122 upon receiving a request. Thus, in various embodiments, multi-tenant computer system 120 receives a first request to provision a first data protection scope for a cloud product having a first set of tenants and a second request to provision a second data protection scope for a service product. In response to the first request, multi-tenant computer system 120 provisions the first data protection scope the cloud product and in response to the second request provisions the second data protection scope, both at the top-most level of hierarchy 122. As discussed herein, subsequently when the cloud product or the service product access the shared infrastructure service 124, their respective data protection scopes are invoked.

In various embodiments, data protection scopes in hierarchy 122 are also provisioned at subordinate levels to the top-most level. Thus, in various embodiments, multi-tenant computer system 120 provisions a first data protection scope, at the top of hierarchy 122, for a cloud product having a first set of tenants and provisions, for a particular one of the first set of tenants, a second data protection scope, at a next level of the hierarchy 122. In such embodiments, this second data protection scope is subordinate to the first data protection scope. Similarly, in some embodiments, multi-tenant computer system 120 provisions, at a top level of hierarchy 122, a first data protection scope for a service product that manages data for cloud products and tenants of the cloud products. Additionally, multi-tenant computer system 120 provisions, at a next level of hierarchy 122, a second data protection scope for the service product in the context of a particular cloud product.

In various embodiments, this nested tenancy model enables multi-tenant computer system 120 to provide shared infrastructure services to multiple cloud products that each have their own sets of tenants and/or service products acting on behalf of cloud products (or tenants of cloud products) by treating these cloud product and service products as first-class tenants (with their subtenants being subordinate). Moreover, this nested tenancy model is scalable such that additional cloud products or service products can be added to the hierarchy as additional first-class tenants. This may be performed, for example, when new cloud products are released or a service product operated by a start-up is integrated into multi-tenant computer system 120 when the start-up is acquired. As discussed herein, an entity associated with a first tenant of a first cloud product is able to extend trust to a second tenant, also associated with the entity, of a second cloud product such that the access of the first tenant and the second tenant to the shared infrastructure services 124 integrated together, allowing an entity to more conveniently access information stored in multiple cloud products. Because of the hierarchy 122, this integrated access is able to reduce complexity in accessing and/or changing information in different cloud products.

Figure 2:
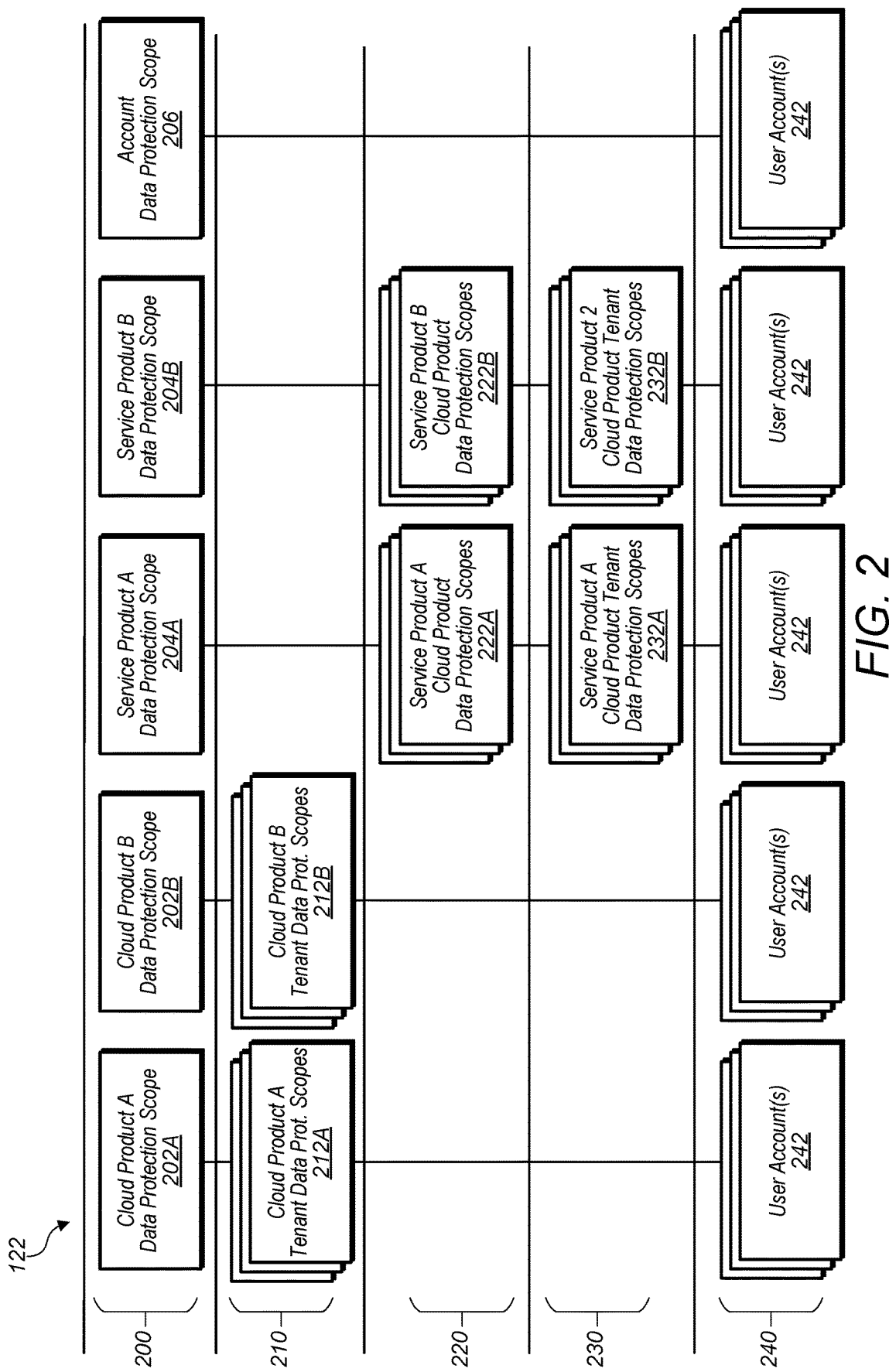
FIG. 2 is an expanded block diagram of the data protection scope hierarchy of FIG. 1 in accordance with various embodiments.

Referring now to FIG. 2, an expanded block diagram of the data protection scope hierarchy 122 of FIG. 1 is shown in accordance with various embodiments. In various embodiments, data protection scope hierarchy 122 includes a plurality of levels (e.g., levels 200, 210, 220, 230, 240) each of which includes one or more data protection scopes (e.g., data protection scopes 202, 204, 206 at level 200, data protections scopes 212 at level 210). As discussed herein, multi-tenant computer system 120 uses data protection scope hierarchy 122 to secure access to information (e.g., shared infrastructure service 124) such that when a remote computer system 110 attempts to access secured information, multi-tenant computer system 120 consults data protection scope hierarchy 122 to determine whether to grant the access attempt. As discussed herein, such access attempts (e.g., requests 112, 114) include identifying a particular data protection scope in data protection scope hierarchy 122 with which such attempts are made (discussed in further detail in reference to FIG. 3 herein) and/or using cryptographic techniques to authenticate such attempts (discussed in further detail in reference to FIG. 4 herein).

In various embodiments, hierarchy 122 includes a plurality of levels. In the embodiment represented in FIG. 2, there are five levels: 200, 210, 220, 230, and 240, although in various other embodiments there may be any of a number of levels numbering two or greater. In the embodiment shown in FIG. 2, level 200 is the top-level of the hierarchy 122 with levels beneath being subordinate to level 200. For example, levels 210 and 220 include data protection scopes 212 and 222 that are directly subordinate to data protection scopes 202 and 204, respectively. Thus, in various embodiments, levels 210 and 220 are subordinate to level 200, level 230 is subordinate to level 220 (and in turn level 210), and level 240 is subordinate to levels 200, 210, 220, and 230.

In data protection scope hierarchy 122, subordinate data protection scopes (e.g., 212, 214, 232) have access equal to or less than their superior data protection scopes (e.g., 202, 204) in various embodiments. In such embodiments, therefore, a tenant of a cloud product would have access only to a subset of the information to which the cloud product has access. In various embodiments, data protection scopes at the same level are also isolated from each other such that at least some of the information accessible with a first data protection scope (e.g., Cloud Product A Data Protection Scope 202A) is isolated from at least some of the information accessible with a second data protection scope (Cloud Product B Data Protection Scope 202B). In various embodiments, though, information is accessible by multiple data protection scopes. In some embodiments, such information that is made available to all data protection scopes at the same level of hierarchy 122, or all data protection scopes of the same type (e.g., all cloud product data protection scopes 202). In some embodiments, a first entity (e.g., a user, a tenant, a subtenant) may grant a second entity (e.g., another user, tenant, or subtenant) access to one or more data protection scopes associated with the first entity (also referred to herein as "extending trust") such that the second entity would have access to information protected by the first entity's data protection scope. For example, a cloud tenant data protection scope 212 and a service product in the context of a cloud tenant data protection scope 232 may share information. Similarly, an entity may be associated with tenants of different cloud products (e.g., 202A and 202B), and the entity may request that information be shared across cloud product tenant data protection scopes for those different cloud products (e.g., 212A, 212B).

Level 200 is the top-most level of hierarchy 122. Cloud product data protection scopes 202, service product data protection scopes 204, and account data protection scopes 206 are in level 200 in the embodiment shown in FIG. 2. In various embodiments, data protection scopes in level 200 are associated with first-class tenants of multi-tenant computer system. As discussed herein, levels in hierarchy 122 subordinate to level 200 are associated with subtenants of these first-class tenants or user accounts used to access tenants or subtenants.

Cloud product data protection scopes 202 are associated with cloud products that each have their own subtenants. As used herein, "cloud products" refers to software that is accessible to its tenants and is useable to perform functions for such tenants (this is distinct from a cloud environment like AMAZON WEB SERVICES that provides distributed hardware and software on which the cloud environment's users can run software). In various embodiments in which multi-tenant computer system 120 is operated by SALESFORCE, examples of cloud products include a Customer Relationship Management (CRM) system that manages data for sales management for its subtenants, a Commerce Cloud that provides a unified commerce platform across multiple channels for subtenants, and a Marketing Cloud that provides digital marketing automation and analytics software and services for subtenants. As shown in FIG. 2, two cloud data protection scopes 202 are provisioned in hierarchy 122: Cloud Product A Data Protection Scope 202A, which has a first set of subtenants, and Cloud Product B Data Protection Scope 202B, which has a second set of subtenants. While two cloud product data protection scopes 202 are shown in FIG. 2, any number may be present in hierarchy 122.

Service product data protection scopes 204 are associated with service products. As used herein, a "service product" is software that is operable to access, change, and/or manage data on behalf of cloud products and/or tenants of cloud products. As used herein, a service product (a) "operates in the context of a cloud product" when it is acting on behalf of a particular cloud product and (b) "operates in the context of a tenant of a cloud product" when it is acting on behalf of a particular tenant of a particular cloud product. In various embodiments in which multi-tenant computer system 120 is operated by SALESFORCE, examples of service products include an Inventory Service that is operable to manage an inventory of items (e.g., with holds on certain items, real-time availability, metrics) or an Asset Optimizer Service that is operable to manage metadata about digital assets for the tenant's commerce store. Various services are operable to access/modify information associated with cloud product data protection scopes 202 and/or access/modify information associated with cloud tenant data protection scopes 212. As shown in FIG. 2, two service product protection scopes 204 are provisioned in hierarchy 122: Service Product A Data Protection Scope 204A and Service Product B Data Protection Scope 204B. As discussed below, subordinate data protection scopes are provisioned for service products operating in the context of cloud products (e.g., service product cloud product data protection scopes 222) or in the context of tenants of cloud products (e.g., service product cloud product tenant data protection scopes 232). While two service product data protection scopes 204 are shown in FIG. 2, any number may be present in hierarchy 122.

Account data protection scope 206 is provisioned to provide access to shared infrastructure service 124 to a single-tenant. No data protection scopes are provisioned subordinately to account data protection scope 206 (although there are one or more user accounts 242 useable to access the account data protection scope 206). While only one account data protection scope 206 is shown in FIG. 2, any number may be present in hierarchy 122.

Level 210 includes cloud product tenant data protection scopes 212 that are subordinate to cloud product data protection scopes 202 in level 200. As shown in FIG. 2, hierarchy 122 includes a plurality of Cloud Product A Tenant Data Protection Scopes 212A that are subordinate to Cloud Product A Data Protection Scope 202A and a plurality of Cloud Product B Tenant Data Protection Scopes 212B that are subordinate to Cloud Product B Data Protection Scope 202B.

Level 220 includes data protection scopes for service products operating in the context of cloud products: service product cloud product data protection scopes 222. These service product cloud product data protection scopes 222 are subordinate to the data protection scopes for their respective service products, but these service product cloud product data protection scopes 222 are also limited by the data scopes for their respective cloud products. Thus, Service Product A Cloud Product Data Protection Scopes 222A are subordinate to Service Product A Data Protection Scope 204A, but because each of the Service Product A Cloud Product Data Protection Scopes 222A are operating in the context of different cloud products, these scopes are also limited by the respective cloud product data protection scopes 202 (e.g., if Service Product A is operating in the context of Cloud Product A, then the relevant Service Product A Cloud Product Data Protection Scope 222A is limited by Cloud Product A Data Protection Scope 202A). Similarly, level 220 also includes a plurality of Service Product B Cloud Product Data Protection Scopes 222B that are subordinate to Service Product B Data Protection Scope 204B (and also limited by relevant cloud product data protection scopes 202).

Level 230 includes data protection scopes for service products operating in the context of tenants of cloud products: service product cloud product tenant data protection scopes 232. These service product cloud product tenant data protection scopes 232 are subordinate to the data protection scopes for their respective service products operating in the context of particular cloud products, but these service product cloud product data protection scopes 222 are also limited by (a) the data scopes for their respective cloud products and (b) the data protection scopes for their respective tenants of those cloud products. Thus, Service Product A Cloud Product Tenant Data Protection Scopes 232A are subordinate to Service Product A Cloud Product Data Protection Scopes 222A, but because each of the Service Product A Cloud Product Tenant Data Protection Scopes 232A are operating in the context of different tenants of cloud products, these scopes are also limited by the respective cloud product data protection scopes 202 (e.g., if Service Product A is operating in the context of a particular tenant of Cloud Product A, then the relevant Service Product A Cloud Product Data Protection Scope 222A is limited by Cloud Product A Data Protection Scope 202A and the Cloud Product A Tenant Data Protection Scopes 212A for that particular tenant). In various other embodiments, levels 220 and 230 are parallel and data protection scopes in level 230 are not subordinate to data protection scopes in level 220. Instead, the limitations on data access imposed by the relevant cloud product data protection scopes 202 and cloud product tenant data protection scopes 212 ensure data protection service product cloud product data protection scopes 222 and service product cloud product tenant data protection scopes 232, respectively.

Level 240 includes user accounts 242 used by end users to access the data protection scopes in hierarchy 122. In various embodiments, user accounts 242 associated with the same data protection scope have different levels of access to the information protected using hierarchy 122. For example, a first user account 242 is associated with a salesman and a second user account 242 is associated with a sales manager who manages the salesman and other salesmen. In such embodiments, the second user account 242 has access to more of the protected data than the first user account 242. However, user accounts 242 do not have access to more information than their respective data protection scopes, in various embodiments. In some embodiments, however, a single user account 242 may be associated with multiple data protection scopes, and may therefore have access to information beyond the scope of a single data protection scope. For example, the second user account 242 for the sales manager discussed above is associated with a tenant of Cloud Product A, a tenant of Cloud Product B, and is associated with Service Product A operating in the context of the tenant of Cloud Product A. In such an embodiment, this second user account 242 would have access to a subset of the information protected with one of the Cloud Product A Tenant Data Protection Scopes 212A, one of the Cloud Product B Tenant Data Protection Scopes 212B, and one of the Service Product A Cloud Product Tenant Data Protection Scopes 232A.

Figure 3:
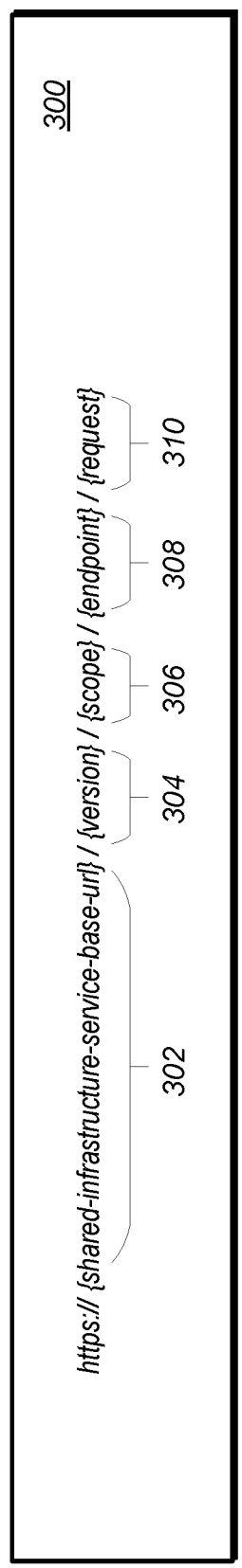
FIG. 3 is a nested multi-tenancy request format template in accordance with various embodiments.

Referring now to FIG. 3, a nested multi-tenancy request format template 300 is shown. In various embodiments, a request 112, 114 formatted according to nested multi-tenancy request format template 300 includes shared infrastructure service endpoint identifier 302, a shared infrastructure version identifier 304, a data protection scope identifier 306, an addressed endpoint identifier 308, and a request path 310. In various embodiments, nested multi-tenancy request format template 300 may include additional segments (e.g., a time sent identifier) or may omit someone of the identifiers depicted in FIG. 3 (e.g., no version identifier 304 is included).

In various embodiments, shared infrastructure service endpoint identifier 302 identifies one or more instances of the particular shared infrastructure service to which the request 112, 114 is directed. In various embodiments, identifier 302 is a formatted similarly to the host portion of an HTTP URL (e.g., "service.example.com"). In such embodiments, the portions of nested multi-tenancy request format template 300 following identifier 302 are formatted similarly to the path component of a HTTP URL. (e.g. "/1/accounts/xyz/data/Individual('1')").

Thus, an example request 112 using nested multi-tenancy request format template 300 is: "http://service.example.com/1/clouds/cloud/admin/Tenants('00')".

Thus, an example request 114 using nested multi-tenancy request format template 300 is: "http://service.example.com/1/clouds/cloud/tenants/00/data/Individual('1')".

In various embodiments, shared infrastructure version identifier 304 is an optional identifier that identifies the version of nested multi-tenancy request format template 300 being used, allowing for multiple versions to be operable. In the example above, "1" indicates nested multi-tenancy request format template 300 version 1.

Data protection scope identifier 306 identifies the particular data protection scope in hierarchy 122 that is (a) being used to provision a new data protection scope in a request 112 (e.g., Cloud Product A Data Protection Scope 202A); or (b) being invoked in a request 112 (e.g., a particular Cloud Product A Tenant Data Protection Scopes 212A). In the example above, "accounts/xyz" is the data protection scope identifier 306 in which "accounts" identifies a cloud product called "accounts" and "xyz" identifies a tenant named "xyz."

In various embodiments, addressed endpoint identifier 308 identifies an endpoint of the shared infrastructure to address. In some instances, addressed endpoint identifier 308 "admin" is used in requests 112 to provision data protection scopes. In other instances, addressed endpoint identifier 308 "metadata" is used in requests 114 to read or write metadata for a given data protection scope. In sill other instances, addressed endpoint identifier 308 "data" is used in requests 114 to read or write data according to deployed metadata.

In various embodiments, request path 310 is the request path. In various embodiments, request path 310 is an OData compliant request path. In the example above "Individual ('1')" is the request path 310.

Accordingly, in various embodiments, when a request 112, 114 formatted according to nested multi-tenancy request format template 300 is received by multi-tenant computer system 120, both the substance of the request (e.g., request path 310) and information on how to process the request 112, 114 are contained within the URL itself. As discussed herein, various portions of request 112, 114 are secured using cryptographic techniques for additional security. For example, data protection scope identifier 306 is included in the cryptographically-generated value (e.g., a cryptographic signature) associated with the relevant cloud product or service product, and in various instances the cloud product tenant. In various embodiments, such a cryptographic signature (and the data protection scope associated therewith) are validated such that multi-tenant computer system 120 is operation to guarantee that the data protection scope cannot be manipulated by third parties. Additionally, in various embodiments, authorization information (e.g., stored at multi-tenant computer system 120, stored in hierarchy 122) is used to ensure that the particular data protection scope invoked in a request 112, 114 is sufficient to perform the action identified in request path 310 (e.g., to ensure that a cloud product data protection scope is not invoked to perform an action that can only be performed using a service product data protection scope) to further secure the system.

Figure 4:
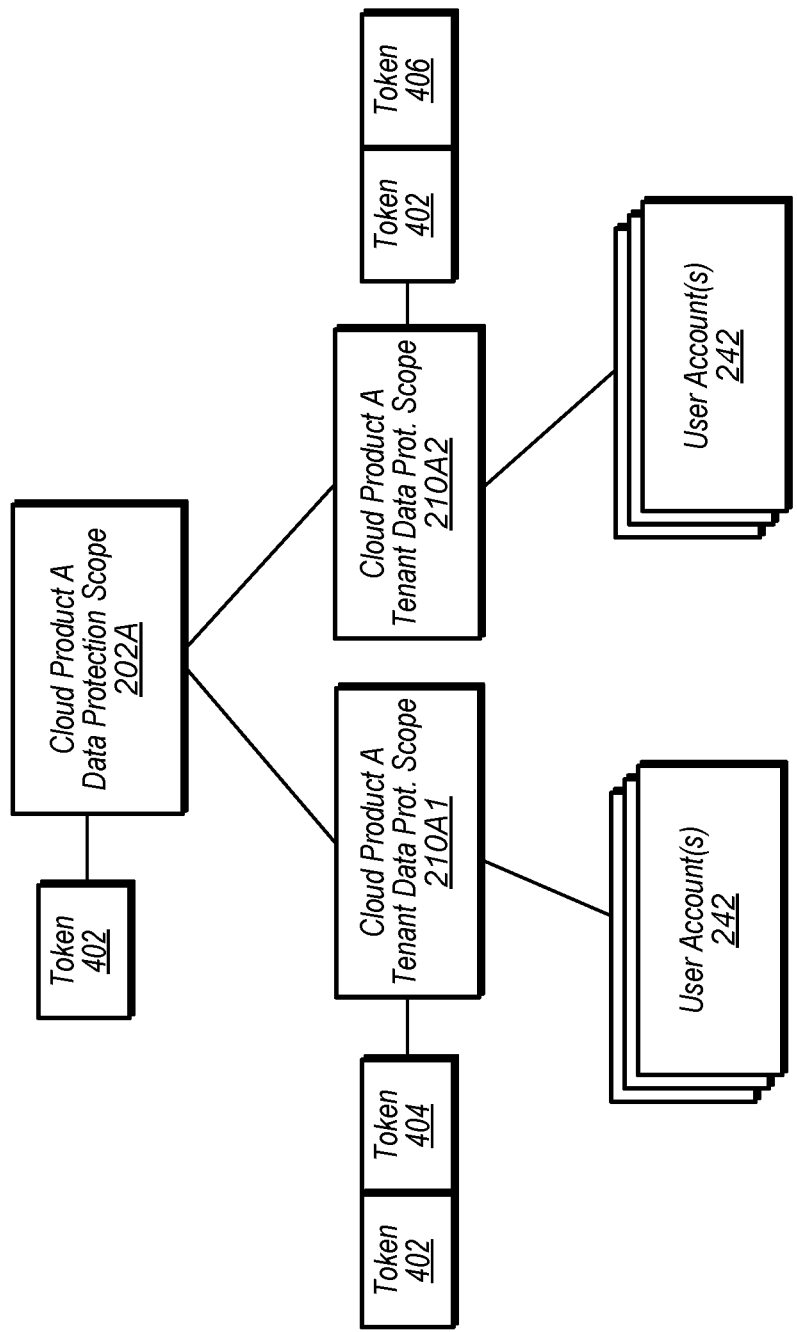
FIG. 4 is a block diagram of cryptographic token relationships in a data protection scope hierarchy in accordance with the disclosed embodiments.

Referring now to FIG. 4, a block diagram of cryptographic token relationships in data protection scope hierarchy 122 is shown. FIG. 4 depicts a portion of data protection scope hierarchy 122 discussed herein in connection to FIG. 2: Cloud Product A Data Protection Scope 202A, two Cloud Product A Tenant Data Protection Scopes 212A1 and 212A2, and user account(s) 242 associated with Cloud Product A Tenant Data Protection Scopes 212A1 and 212A2. As shown herein, Cloud Product A Data Protection Scope 202A is associated with token 402, Cloud Product A Tenant Data Protection Scopes 212A1 is associated with token 404 (which is based on token 402), and Cloud Product A Tenant Data Protection Scopes 212A2 is associated with token 406 (which is based on token 402). In various embodiments, user accounts 242 also use tokens (not shown) that may be based on tokens 402, 404, and/or 406.

In various embodiments, when data protection scope in provisioned in hierarchy 122, a cryptographic key is generated and associated with the provisioned data protection scope. For example, when Cloud Product A Data Protection Scope 202A is provisioned, tokens 402 are able to be generated for use in subsequent information access requests. In such embodiments, such tokens 402 are signed with information (e.g., a cryptographic key) associated with the respective data protection scope (e.g., a token 402 useable to access information associated with Cloud Product A Data Protection Scope 202A is signed with a one or more cryptographic keys associated with Cloud Product A Data Protection Scope 202A) Subsequent invocations of Cloud Product A Data Protection Scope 202A (e.g., in requests 114) must by be authenticated using token 402. In various embodiments, request 114 includes token 402, for example. Upon determining that request 114 includes the appropriate token (e.g., token 402), multi-tenant computer system is configured to grant request 114. In various embodiments, multiple tokens are included with request 114. In some of such embodiments, a separate token (e.g., tokens 404, 406) associated with a subordinate data protection scope is included with requests 112, 114. In some of such embodiments, requests 112, 114 made using a subordinate data protection is also signed using the token 402 associated with its superior data protection scope(s). In some of such embodiments, token 402 is signed with the token 404, 406 and the signed token 402 is included in request 112, 114.

In various embodiments, tokens 402, 404, and 406 are JSON web tokens ("JWT") that addresses the appropriate data protection scope at the top level (e.g., level 200) of hierarchy 122. In various embodiments, a JWT address the appropriate data protection scope using a UUID computed based on: (1) an identifier of the shared infrastructure service 124 and (2) a shared infrastructure service endpoint identifier (e.g., shared infrastructure service endpoint identifier 302). In instances where the token is associated with a cloud product tenant (e.g., tokens 404, 406), an identifier of the cloud product tenant is also used to calculate the UUID. In various embodiments, such JWTs include indications of the issuer, the issuer type, audience, an audience type, and an "integration binding." In various embodiments, the issuer is an identifier of the top-level tenant (e.g., a tenant of multi-tenant computer system 120 associated with a data protection scope at level 200), issuer type is an indication of the type of top-level tenant (e.g., a top-level tenant, .service product), audience is the particular shared infrastructure service 124 targeting a data protection scope, audience type is a descriptor of the particular shared infrastructure service 124, and the integration binding which adds context about the data protection scope. In various embodiments, the integrating binding is an additional authorization mechanism. In such embodiments, shared service 124 is operable to determine (e.g., by accessing metadata) which data protection scopes are authorized to access the various integration bindings. In various embodiments, shared service 124 is also operable to add constrains on access made with particular integration bindings. For example, if "service-a.context" is an integration binding and shared service 124 is operable to only permit the "service-a" cloud product to use this context. Further, if this context is used in a request, only actions that a cloud product (e.g., not accesses that would be performed by a service product) would be permitted to be performed using this context.

As a first example, in an instance for a shared service 124 "service-a," a cloud product "service-b" and a cloud product tenant "001," the token associated with the cloud product tenant (e.g., token 404 or token 406) includes:
    iss="service-b/001"
    ist="tenant"
    aud="service-a/service-b.001"
    aut="tenant"
    ctx="service-a.context"

As a second example, in an instance in which trust has been extended from a tenant "001" of a first cloud product "service-b" to a tenant "abc" of another cloud product "service-c" in a shared service 124 "service-a" the token associated with the cloud product tenant (e.g., token 404 or token 406) includes:
    iss="service-c/abc"
    ist="tenant"
    aud="service-a/service-a.001"
    aut="tenant"
    ctx="service-a.context"

As a third example, in an instance for a shared service 124 "service-a," a service product "service-d," the token (not shown) includes:
    iss="service-d"
    ist="service"
    aud="service-a"
    aut="cloud"
    ctx="service-a.context.service-d.global"

As a fourth example, in an instance for a shared service 124 "service-a," a service product "service-d" operating in the context of a tenant of a cloud product "service-c," the token (not shown) wraps the token for the tenant of the cloud product (e.g., token 404, token 406) and includes:
    iss="service-c/abc"
    ist="proxy-issuer"
    aud="service-a/service-c.abc"
    aut="tenant"
    ctx="service-a.context.service-c"

Figure 5:
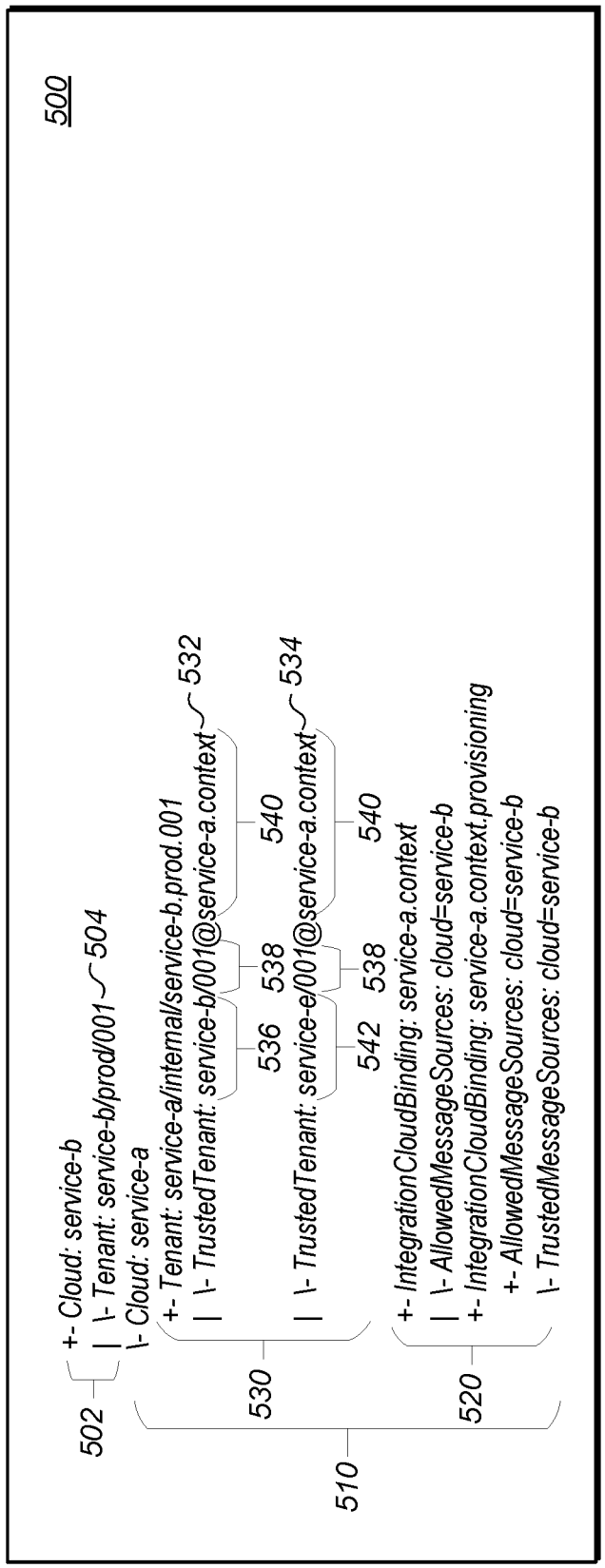
FIG. 5 is a block diagram illustrating a provisioning method for a cloud product data protection scope and a cloud product tenant data protection scope in accordance with various embodiments.

Referring now to FIG. 5, a block diagram illustrating a provisioning method 500 for a cloud product data protection scope and a cloud product tenant data protection scope is shown. As depicted in FIG. 5, provisioning method 500 is represented in pseudocode that represents operations that can be performed by multi-tenant computer system 120. It will be understood that the operations represented by the pseudocode in FIG. 5 can be represented in any of a number of programming languages and/or pseudocode paradigms. Similarly, the disclosed embodiments are not limited by the labels given to variables (e.g., "service-a," "service-b") and such labels are merely examples. Provisioning method 500 includes two pseudocode blocks relating to the provisioning of a cloud product "service-b" within a hierarchy 122 used to control access to a shared infrastructure service 124 "service-a." In block 502, cloud product "service-b" is declared, and "service-b" is usable to identify the cloud product in method 500. In block 510, cloud product "service-b" is linked to shared infrastructure service 124 "service-a." In block 520, cloud product "service-b" and is added to the integration bindings for shared infrastructure service 124 "service-a" for both provisioning (e.g., provisioning cloud product tenant data protection scopes 212) and runtime (e.g., handling requests 114).

FIG. 5 also includes pseudocode in which cloud product tenant data protection scopes 212 are provisioned at line 504. In various embodiments, cloud product tenant data protection scopes 212 are provisioned at runtime once a cloud product data protection scope 202 is provisioned for cloud product "service-b." At line 504, a cloud product tenant with identifier "001" is provisioned under cloud product "service-b." In various embodiments, the cloud product tenant identifier is a universally unique identifier ("UUID").

Block 530 includes pseudocode representing the extension of a trust relationship between one or more cloud product tenants and cloud product "service-b." At line 532, trust is extended for a cloud product tenant of cloud product "service-b." Cloud product "service-b" is identified at 536, the cloud product tenant identifier is identified at 538, and the shared infrastructure service 124 is identified at 540. At optional line 534, trust is extended for a cloud product tenant of another cloud product (cloud product "service-e") to cloud product "service-b." In various embodiments, this is useful for integration scenarios where a customer has multiple tenants in different cloud products. As shown in line 534, an example is granting access to a cloud product data protection scope 202 for cloud product "service-b" to a cloud product tenant of cloud product "service-e," identified at 542. Indications of these trust relationships are stored (e.g., in hierarchy 122) and are used to determine whether to grant a request to access information. For example, if first information is associated with a first data protection scope (e.g., a first cloud product tenant data protection scope 212) and second information is associated with a second data protection scope (e.g., a second cloud product tenant data protection scope 212), if trust is extended between both data protection scopes for a particular entity (e.g., one or more user accounts 242), requests 114 to access the first information or second information from the particular entity are granted based on determining that trust has been extended as discussed herein.

Figure 6:
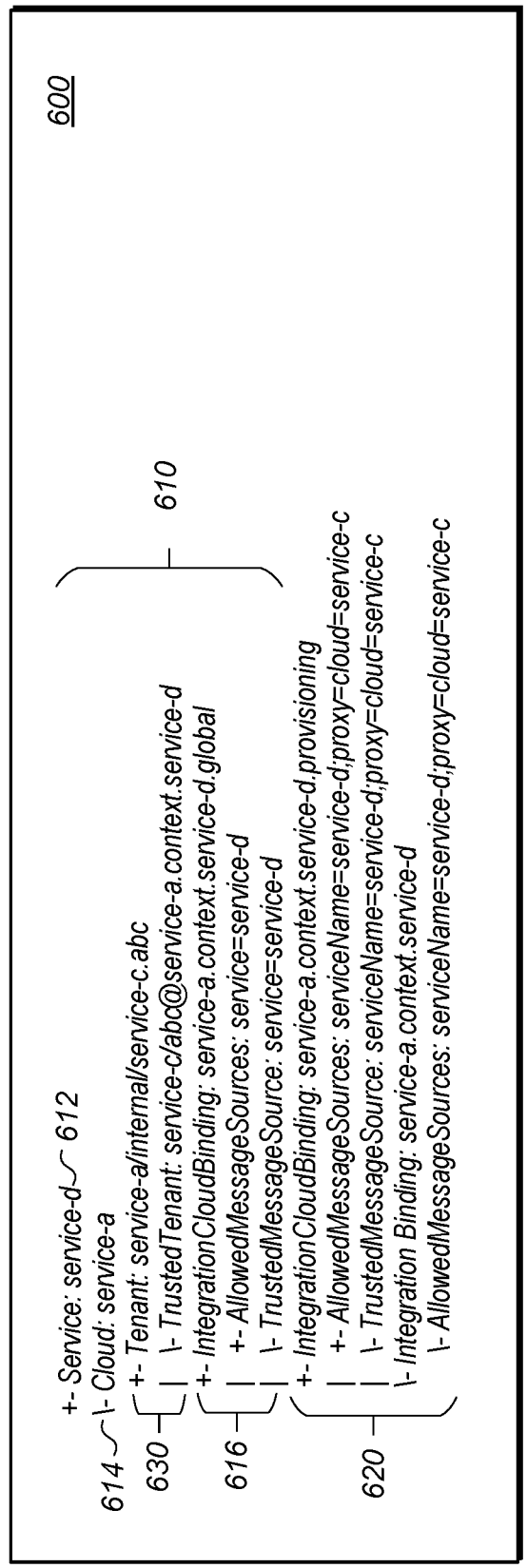
FIG. 6 is block diagram illustrating a provisioning method for a service product data protection scope and a service product in the context of the cloud product data protection scope.

Referring now to FIG. 6, a block diagram illustrating provisioning method 600 for a service product data protection scope and a service product in the context of the cloud product data protection scope is shown. As depicted in FIG. 6, provisioning method 600 is represented in pseudocode that represents operations that can be performed by multi-tenant computer system 120. It will be understood that the operations represented by the pseudocode in FIG. 6 can be represented in any of a number of programming languages and/or pseudocode paradigms. Similarly, the disclosed embodiments are not limited by the labels given to variables (e.g., "service-b") and such labels are merely examples. Method 600 includes two blocks: a block 610 relating to the provisioning of the service product data protection scope 204 associated with a particular service product and block 620 relating to the provisioning of service product cloud product data protection scopes 222 subordinate to the service product data protection scope 204.

Block 610 includes indications of the service product (named "service-d" in the instance shown in FIG. 6) at line 612 and of the shared infrastructure service 124 (named "service-a" in the instance shown in FIG. 6) at line 614. At block 616, service product "service-d" and is added to the integration bindings for shared infrastructure service 124 "service-a." At block 630, service product "service-d" is provisioned to operate in the context of tenant "abc" of cloud product "service-c" with relevant service product cloud product tenant data protection scopes 232 being provisioned.

Block 620 includes pseudocode to add service product "service-d" is added to the integration bindings for cloud product "service-c" for both provisioning (e.g., provisioning cloud product tenant data protection scopes 212) and runtime (e.g., handling requests 114). The pseudocode in block 620 is associated with provisioning service product cloud product data protection scopes 222.

Figure 7:
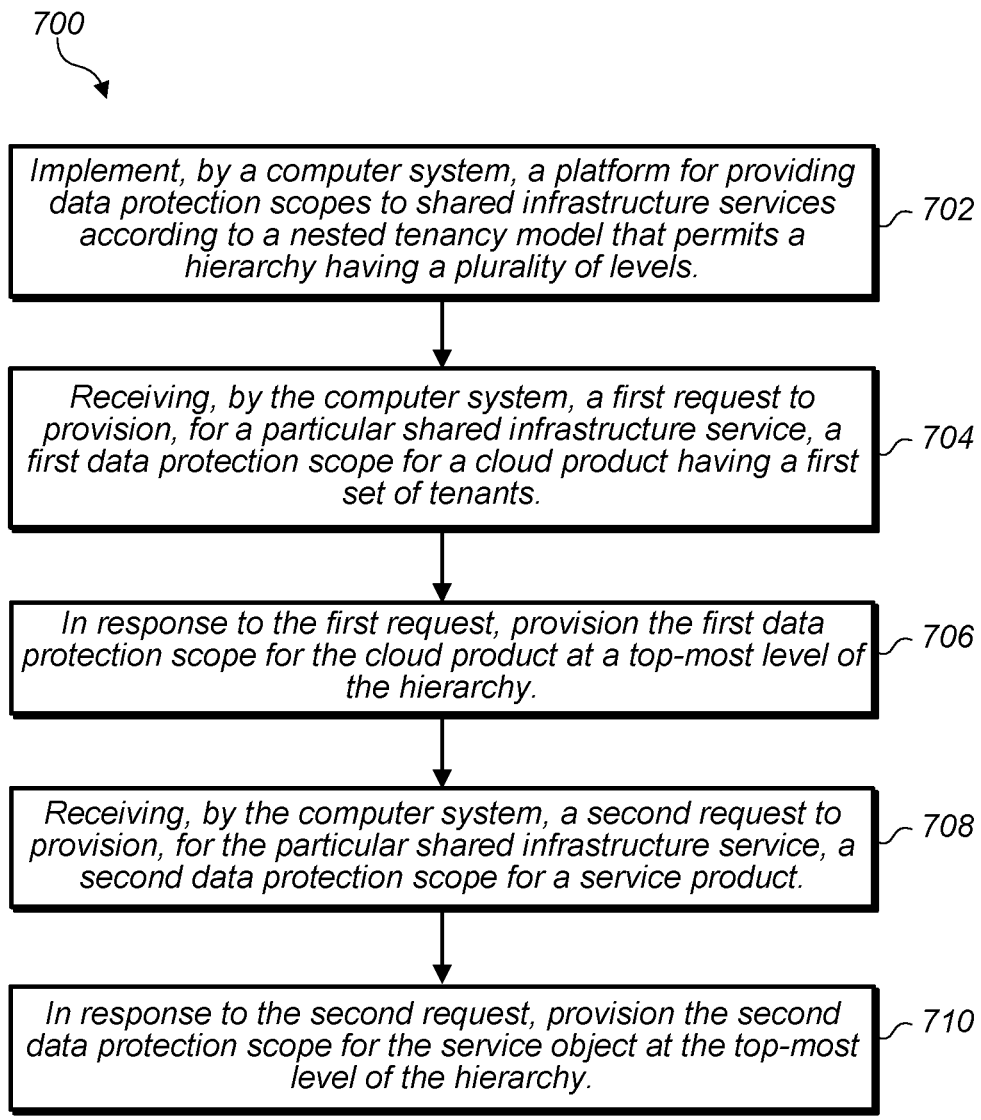

Referring now to FIG. 7, a flowchart illustrating an embodiment of a provisioning method 700 is shown. In various embodiments, the various actions associated with method 700 are performed with multi-tenant computer system 120. At block 702, multi-tenant computer system 120 implements a platform for providing data protection scopes to shared infrastructure services 124 according to a nested tenancy model that permits a hierarchy 122 having a plurality of levels (e.g., levels 200, 210, 220, 230). At block 704, multi-tenant computer system 120 receives a first request 112 to provision, for a particular shared infrastructure service 124, a first data protection scope 202 for a cloud product having a first set of tenants. At block 706, in response to the first request 112, multi-tenant computer system 120 provisions the first data protection scope 202 for the cloud product at a top-most level 200 of hierarchy 122. At block 708, multi-tenant computer system 120 receives a second request 112 to provision, for the particular shared infrastructure service 124, a second data protection scope 204 for a service product. At block 710, multi-tenant computer system 120 provisions the second data protection scope for the service object at the top-most level of the hierarchy.

Referring now to FIG. 8A, a flowchart illustrating an embodiment of a provisioning method 800 is shown. In various embodiments, the various actions associated with method 800 are performed with multi-tenant computer system 120. At block 802, multi-tenant computer system 120 provisions, for a shared infrastructure service 124, a first data protection scope 202 for a cloud product having a first set of tenants. As discussed herein, the first data protection scope 292 is provisioned at a top level 200 of a scope hierarchy 122. At block 804, multi-tenant computer system 120 provisions, for the shared infrastructure service 124, a second data protection scope 212 for a particular one of the first set of tenants, wherein the second data protection scope 212 is provisioned at a next level 210 of the scope hierarchy 122. As discussed herein, the second data protection scope 212 is provisioned subordinately to the first data protection scope 202 in the scope hierarchy 122.

Referring now to FIG. 8B, a flowchart illustrating an embodiment of a provisioning method 810 is shown. In various embodiments, the various actions associated with method 810 are performed with multi-tenant computer system 120. At block 812, multi-tenant computer system 120 provisions, for a shared infrastructure service 124, a first data protection scope 204 for a service product that manages data for cloud products and tenants of the cloud products As discussed herein, the first data protection scope 204 is provisioned at a top level 200 of a scope hierarchy 122. At block 814, multi-tenant computer system 120 provisions, for the shared infrastructure service 124, a second data protection scope 222 for the service product in the context of a particular cloud product. As discussed herein, the second data protection scope 222 is provisioned at a second level 220 of the scope hierarchy 122. At block 816, multi-tenant computer system 120 provisions a third data protection scope 232 for the service product in the context of a particular tenant of the particular cloud product. As discussed herein, the third data protection scope 232 is provisioned at a third level 230 of the scope hierarchy subordinate to the top level 200 and the second level 220.

Exemplary Computer System

Figure 9:
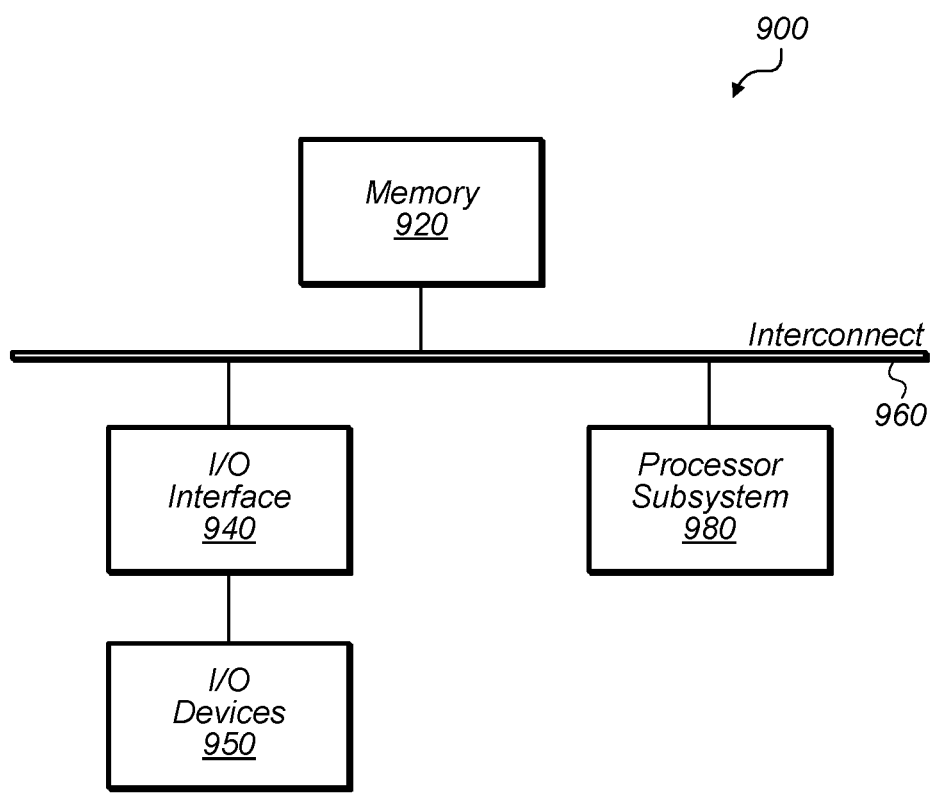
FIG. 9 is a block diagram of an exemplary computer system, which may implement the various components of FIG. 1.

Turning now to FIG. 9, a block diagram of an exemplary computer system 900, which may implement the various components of computer system 100 (e.g., remote computer system 110, multi-tenant computer system 120) is depicted. Computer system 900 includes a processor subsystem 980 that is coupled to a system memory 920 and I/O interfaces(s) 940 via an interconnect 960 (e.g., a system bus). I/O interface(s) 940 is coupled to one or more I/O devices 950. Computer system 900 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 900 is shown in FIG. 9 for convenience, system 900 may also be implemented as two or more computer systems operating together.

Processor subsystem 980 may include one or more processors or processing units. In various embodiments of computer system 900, multiple instances of processor subsystem 980 may be coupled to interconnect 960. In various embodiments, processor subsystem 980 (or each processor unit within 980) may contain a cache or other form of on-board memory.

System memory 920 is usable to store program instructions executable by processor subsystem 980 to cause system 900 perform various operations described herein. System memory 920 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 900 is not limited to primary storage such as memory 920. Rather, computer system 900 may also include other forms of storage such as cache memory in processor subsystem 980 and secondary storage on I/O Devices 950 (e.g., a hard drive, storage array, etc.). In some embodiments, these other forms of storage may also store program instructions executable by processor subsystem 980.

I/O interfaces 940 may be any of various types of interfaces configured to couple to and communicate with other devices, according to various embodiments. In one embodiment, I/O interface 940 is a bridge chip (e.g., Southbridge) from a front-side to one or more back-side buses. I/O interfaces 940 may be coupled to one or more I/O devices 950 via one or more corresponding buses or other interfaces. Examples of I/O devices 950 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 900 is coupled to a network via a network interface device 950 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    implementing, by a computer system, a platform for providing data protection scopes to shared infrastructure services according to a nested tenancy model that permits a hierarchy having a plurality of levels, wherein a given level, of the plurality of levels in the hierarchy, is associated with a level of access to one or more of the shared infrastructure services;
    receiving, by the computer system, a first request to provision, for a particular shared infrastructure service, a first data protection scope for a first cloud product having a first set of tenants, wherein a cloud product is software accessible to a set of tenants and operable to perform a set of functions for the set of tenants;
    in response to the first request, provisioning the first data protection scope for the first cloud product at a top-most level of the hierarchy, wherein the top-most level of the hierarchy is associated with a particular level of access to the particular shared infrastructure service;
    receiving, by the computer system, a second request to provision, for the particular shared infrastructure service, a second data protection scope for a second cloud product having a second, different set of tenants;
    in response to the second request, provisioning the second data protection scope for the second cloud product at the top-most level of the hierarchy;
    receiving, by the computer system, a third request to provision, for the particular shared infrastructure service, a third data protection scope for a service product, wherein the service product is software operable to access data on behalf of the first and second cloud products and/or tenants of the first and second cloud products;
    in response to the third request, provisioning the third data protection scope for the service product at the top-most level of the hierarchy;
    receiving, by the computer system, an access request from a remote computer system to access information associated with a particular data protection scope at a particular level of the hierarchy, wherein the access request is received via a URL that indicates the particular data protection scope; and
    wherein adding 1) cloud products with different sets of tenants and 2) service products to the top-most level of the hierarchy permits the platform to scale without reconfiguring entities currently managed by the platform.

2. The method of claim 1, further comprising:
    provisioning, by the computer system, a fourth data protection scope for a particular one of the first set of tenants, wherein the fourth data protection scope is provisioned at a next level of the hierarchy;
    wherein the fourth data protection scope is provisioned subordinately to the first data protection scope in the hierarchy.

3. The method of claim 2,
    wherein provisioning the first data protection scope includes generating a cloud product identifier for the cloud product; and
    wherein provisioning the fourth data protection scope includes generating a cloud product tenant identifier for the particular one of the first set of tenants, wherein the cloud product tenant identifier includes the cloud product identifier.

4. The method of claim 2, wherein provisioning the fourth data protection scope includes storing an indicator of a trust relationship between the particular one of the first set of tenants and the cloud product.

5. The method of claim 1, further comprising:
    provisioning, by the computer system, a fourth data protection scope for a particular cloud product accessing the particular shared infrastructure service in the context of the service product;
    wherein the fourth data protection scope is provisioned subordinately to the third data protection scope in the hierarchy.

6. The method of claim 5, further comprising:
    provisioning, by the computer system, a fifth data protection scope for a particular tenant of the particular cloud product accessing the particular shared infrastructure service in the context of the service product;
    wherein the fifth data protection scope is provisioned subordinately to the fifth data protection scope in the hierarchy.

7. The method of claim 1, further comprising:
    provisioning, by the computer system, a single-tenant data protection scope at the top-most level of the hierarchy;
    wherein there are no data protection scopes provisioned subordinately to the single-tenant data protection scope.

8. The method of claim 1, further comprising:
    receiving, by the computer system, an access request from a remote computer system to access information associated with a particular data protection scope at a particular level of the hierarchy;
    wherein the access request includes an indicator of whether the particular data protection scope is authorized to submit the access request.

9. The method of claim 1, wherein the particular shared infrastructure service includes a shared template service operable to:
    provide one or more selectable database templates that define data types supported for a non-relational database accessible to an application;
    service a request from the application to manipulate a particular data type defined by a selected database template;
    in response to the request from the application, identify a set of data manipulation language (DML) instructions based on the selected database template; and
    issue the identified set of DML instructions to the non-relational database.

10. A non-transitory, computer-readable storage medium storing program instructions that are capable of being executed by a computer system to perform operations comprising:
    implementing a platform for providing data protection scopes to shared infrastructure services according to a nested tenancy model that permits a hierarchy having a plurality of levels, wherein a given level, of the plurality of levels in the hierarchy, is associated with a level of access to one or more of the shared infrastructure services;

receiving a first request to provision, for a particular shared infrastructure service, a first data protection scope for a first cloud product having a first set of tenants, wherein a cloud product is software accessible to a set of tenants and operable to perform a set of functions for the set of tenants;

in response to the first request, provisioning the first data protection scope for the first cloud product at a top-most level of the hierarchy, wherein the top-most level of the hierarchy is associated with a particular level of access to the particular shared infrastructure service;

receiving a second request to provision, for the particular shared infrastructure service, a second data protection scope for a second cloud product having a second, different set of tenants;

in response to the second request, provisioning the second data protection scope for the second cloud product at the top-most level of the hierarchy;

receiving a third request to provision, for the particular shared infrastructure service, a third data protection scope for a service product, wherein the service product is software operable to access data on behalf of the first and second cloud products and/or tenants of the first and second cloud products;

in response to the third request, provisioning the third data protection scope for the service product at the top-most level of the hierarchy;

receiving an access request from a remote computer system to access information associated with a particular data protection scope at a particular level of the hierarchy, wherein the access request is received via a URL that indicates the particular data protection scope; and wherein adding 1) cloud products with different sets of tenants and 2) service products to the top-most level of the hierarchy permits the platform to scale without reconfiguring entities currently managed by the platform.

11. The non-transitory, computer-readable medium of claim 10, wherein the operations further comprise:

provisioning a fourth data protection scope for a particular one of the first set of tenants, wherein the fourth data protection scope is provisioned at a next level of the hierarchy;

wherein the fourth data protection scope is provisioned subordinately to the first data protection scope in the hierarchy.

12. The non-transitory, computer-readable medium of claim 11, wherein provisioning the first data protection scope includes generating a cloud product identifier for the cloud product; and wherein provisioning the fourth data protection scope includes generating a cloud product tenant identifier for the particular one of the first set of tenants, wherein the cloud product tenant identifier includes the cloud product identifier.

13. The non-transitory, computer-readable medium of claim 11, wherein provisioning the fourth data protection scope includes storing an indicator of a trust relationship between the particular one of the first set of tenants and the cloud product.

14. The non-transitory, computer-readable medium of claim 10, wherein the operations further comprise:

provisioning a fourth data protection scope for a particular cloud product accessing the particular shared infrastructure service in the context of the service product, wherein the fourth data protection scope is provisioned subordinately to the third data protection scope in the hierarchy.

15. The non-transitory, computer-readable medium of claim 14, wherein the operations further comprise:

provisioning a fifth data protection scope for a particular tenant of the particular cloud product accessing the particular shared infrastructure service in the context of the service product, wherein the fifth data protection scope is provisioned subordinately to the fourth data protection scope in the hierarchy.

16. A computer system, comprising:

a processor system;

a memory storing program instructions that are executable by the processor system to perform operations comprising:

implementing a platform for providing data protection scopes to shared tenancy infrastructure services according to a nested tenancy model that permits a hierarchy having a plurality of levels, wherein a given level, of the plurality of levels in the hierarchy, is associated with a level of access to one or more of the shared infrastructure services;

receiving a first request to provision, for a particular shared infrastructure service, a first data protection scope for a first cloud product having a first set of tenants, wherein a cloud product is software accessible to a set of tenants and operable to perform a set of functions for the set of tenants;

in response to the first request, provisioning the first data protection scope for the first cloud product at a top-most level of the hierarchy, wherein the top-most level of the hierarchy is associated with a particular level of access to the particular shared infrastructure service;

receiving a second request to provision, for the particular shared infrastructure service, a second data protection scope for a second cloud product having a second, different set of tenants;

in response to the second request, provisioning the second data protection scope for the second cloud product at the top-most level of the hierarchy;

receiving a third request to provision, for the particular shared infrastructure service, a third data protection scope for a service product, wherein the service product is software operable to access data on behalf of the first and second cloud products and/or tenants of the first and second cloud products;

in response to the third request, provisioning the third data protection scope for the service product at the top-most level of the hierarchy;

receiving an access request from a remote computer system to access information associated with a particular data protection scope at a particular level of the hierarchy, wherein the access request is received via a URL that indicates the particular data protection scope; and wherein adding 1) cloud products with different sets of tenants and 2) service products to the top-most level of the hierarchy permits the platform to scale without reconfiguring entities currently managed by the platform.

17. The computer system of claim 16, wherein the operations further comprise:
  provisioning a single-tenant data protection scope at the top-most level of the hierarchy;
  wherein there are no data protection scopes provisioned subordinately to the single-tenant data protection scope.

18. The computer system of claim 16, further comprising:
  receiving an access request from a remote computer system to access information associated with a particular data protection scope at a particular level of the hierarchy, wherein the access request includes an indicator of whether the particular data protection scope is authorized to submit the access request.

19. The computer system of claim 16, wherein the particular shared infrastructure service provides a scheduling service.

20. The computer system of claim 16, wherein the service product is software operable to access data on behalf of the first and second cloud products.

* * * * *